(12) United States Patent
Madawala et al.

(10) Patent No.: US 10,075,086 B2
(45) Date of Patent: Sep. 11, 2018

(54) INDUCTIVE POWER TRANSFER CONVERTERS AND SYSTEM

(71) Applicant: Auckland UniServices Limited, Auckland (NZ)

(72) Inventors: Udaya Kumara Madawala, Stonefields (NZ); Duleepa Jayanath Thrimawithana, Mt Wellington (NZ)

(73) Assignee: Auckland UniServices Limited, Auckland (NZ)

( * ) Notice: Subject to any disclaimer, the term of this patent is extended or adjusted under 35 U.S.C. 154(b) by 0 days.

(21) Appl. No.: 15/302,304

(22) PCT Filed: Apr. 2, 2015

(86) PCT No.: PCT/NZ2015/050042
§ 371 (c)(1),
(2) Date: Oct. 6, 2016

(87) PCT Pub. No.: WO2015/156689
PCT Pub. Date: Oct. 15, 2015

(65) Prior Publication Data
US 2017/0033693 A1     Feb. 2, 2017

(30) Foreign Application Priority Data
Apr. 9, 2014   (NZ) ........................ 622166

(51) Int. Cl.
| H02M 3/335 | (2006.01) |
| H02M 3/337 | (2006.01) |
| H02J 50/12 | (2016.01) |
| H01F 38/14 | (2006.01) |
| H02J 7/04  | (2006.01) |
| H02M 1/00  | (2006.01) |

(52) U.S. Cl.
CPC .......... H02M 3/3378 (2013.01); H01F 38/14 (2013.01); H02J 50/12 (2016.02);
(Continued)

(58) Field of Classification Search
CPC ............ H02M 3/335; H02M 3/33523; H02M 3/33569; H02M 3/337; H02M 3/3372;
(Continued)

(56) References Cited

U.S. PATENT DOCUMENTS

| 3,596,165 A | * | 7/1971 | Andrews ............. H02M 3/3387 363/16 |
| 5,053,937 A | * | 10/1991 | Blockl ................ H02M 3/3376 363/16 |

(Continued)

FOREIGN PATENT DOCUMENTS

WO    WO-2015/156689        10/2015

OTHER PUBLICATIONS

"International Application No. PCT/NZ2015/050042, International Preliminary Report on Patentability dated Oct. 12, 2016", (Oct. 12, 2016), 6 pgs.

(Continued)

*Primary Examiner* — Gary L Laxton
(74) *Attorney, Agent, or Firm* — Schwegman Lundberg & Woessner, P.A.

(57) ABSTRACT

An IPT system for wireless power transfer is provided, in particular an IPT system capable of operating at high frequencies. In one aspect there is provided an IPT transmitter comprising a push-pull resonant converter having a resonant frequency and configured to operate at a switching frequency below the resonant frequency and dependent on a switching characteristic of a second converter configured to inductively couple to said transmitter.

19 Claims, 4 Drawing Sheets

(52) U.S. Cl.
CPC ....... *H02M 3/337* (2013.01); *H02M 3/33576* (2013.01); *H02M 2001/0058* (2013.01); *Y02B 70/1433* (2013.01); *Y02B 70/1491* (2013.01)

(58) Field of Classification Search
CPC ............. H02M 3/3374; H02M 3/3376; H02M 3/3378; H02M 1/4241; H02M 2007/4811; H02M 2007/4815; H02J 7/02; H02J 7/16; H02J 7/04; H01F 38/14
See application file for complete search history.

(56) References Cited

U.S. PATENT DOCUMENTS

| | | | |
|---|---|---|---|
| 5,293,308 A * | 3/1994 | Boys | H02J 5/005 363/37 |
| 8,619,437 B2 * | 12/2013 | Hachiya | B60L 11/1812 363/20 |
| 9,762,115 B2 * | 9/2017 | Sharma | H02M 1/10 |
| 2008/0247210 A1 | 10/2008 | Hu | |
| 2013/0207601 A1 | 8/2013 | Wu et al. | |
| 2013/0234531 A1 | 9/2013 | Budgett et al. | |

OTHER PUBLICATIONS

"International Application No. PCT/NZ2015/050042, International Search Report and Written Opinion dated May 13, 2015", (May 13, 2015), 9 pgs.

\* cited by examiner

INDUCTIVE POWER TRANSFER CONVERTERS AND SYSTEM

PRIORITY CLAIM TO RELATED APPLICATIONS

This application is a U.S. national stage application filed under 35 U.S.C. § 371 from International Application Serial No. PCT/NZ2015/050042, which was filed 2 Apr. 2015, and published as WO2015/156689 on 15 Oct. 2015, and which claims priority to New Zealand Application No. 622166, filed 9 Apr. 2014, which applications and publication are incorporated by reference as if reproduced herein and made a part hereof in their entirety, and the benefit of priority of each of which is claimed herein.

TECHNICAL FIELD

The present invention relates to an inductive power transfer (IPT) system for wireless power transfer, in particular although not exclusively an IPT system capable of operating at high frequencies.

BACKGROUND

More devices are preferably, or now essentially, wirelessly powered and this trend is expected to continue with the increasing global demand for and acceptance of such devices. Ideally, such wireless power transfer must take place at very high frequency to enable compact and elegant designs. However, the current wireless power technology is still at a stage where it can support 'efficient' wireless power transfer only at sub MHz or well below the desired frequencies.

Typically inductive power transfer (IPT) systems are operated at relatively low frequencies in the range of 10 kHz to 200 kHz to avoid unacceptable levels of switching losses, incurring at higher frequencies. However, there has always been a demand for efficient operation of IPT systems at much higher frequencies, in the range of several MHz, to allow for the design of compact and efficient consumer electronics. Existing IPT systems are not suitable for operation in the MHz frequencies being inefficient due to unavoidable high losses at elevated frequencies. This can be caused by switching losses incurred for each switching operation, as well as the inefficiency of monitoring the zero voltage and/or current switching timings.

A push-pull resonant inverter as described by Hu et al (US 20080247210) involves an input power source which is divided between two inductive elements. Operation of the switches enables an appropriate current to flow in the resonant circuit and generate fields suitable for wireless power transfer. The push-pull resonant converter is typically loosely coupled to one or more passive, rectifying pick-ups with a connected load. Although the push-pull resonators are popular, controlling the switching means may be complicated, especially as the frequency of operation increases. In particular the switching frequency is often load dependent and must be determined by monitoring the circuit for zero voltage or current situations.

OBJECTS

It is an object of the invention to provide an IPT converter which will at least go some way to overcoming disadvantages of existing systems, or which will at least provide a useful alternative to existing systems.

Further objects of the invention will become apparent from the following description.

SUMMARY

Accordingly in one aspect there is provided an IPT transmitter comprising:
 a push-pull resonant converter having a resonant frequency; and configured to operate at a switching frequency below the resonant frequency and dependent on a switching characteristic of a second converter configured to inductively couple to said transmitter.
 In an embodiment the transmitter further comprises:
 means for determining a switching characteristic corresponding to the switching of a second converter coupled to said IPT converter;
 switching means arranged to operate at a switching frequency below the resonant frequency and dependent on the switching characteristic.

The switching characteristic of the second converter is a measurable, detectable or estimable characteristic of the second converter's switching operation either on its own or in relation to the switching operation of the first converter. For example the switching characteristic may include the relative phase difference between the switching signals, a timing signal or an indication of the switching positions. The switching means of the resonant converter may be operated in a particular manner in relation to the switching of the second converter. For example the switching means may be synchronised or offset from the switching of the second converter.

Maintaining switching frequency below the resonant frequency allows the converter to switch at zero voltage without monitoring for zero-crossing points. Switching at zero voltage improves switching efficiency and not having to monitor for these zero-crossing points and control switching depending on this monitoring enables higher frequency operation. As is known the resonant frequency may be affected by changes in loading of the secondary and coupling between the primary and secondary converters, for example changing distance between these. By setting the switching frequency below the resonant frequency anticipated for a range of loading and coupling conditions, zero voltage switching can be maintained for these conditions without the need for monitoring for zero-crossing points.

Further adjusting the switching dependent on a switching characteristic of the second converter allows improved efficiency of the wireless power transfer and power flow control. The efficiency improvement is because the second converter can compensate for, and make better use of, the non-sinusoidal power flow.

In an embodiment the switching characteristic used is a phase reference.

In an embodiment the phase reference is determined by a communication signal received from the second converter. The communication signal could be a wired or wireless channel including but not limited to an optical or RF link or a digital phase-lock-loop (PLL). The second converter may employ sensor circuits to derive the phase reference of the first converter.

In an embodiment the phase reference is determined by sensing a circuit characteristic. For instance, through the use of a sense winding to measure the magnetic fields produced by the first or second converter. Alternatively, characteristics of the second converter, for example real and reactive power transferred to the output by the second converter or the impedance seen by the primary load or the reflected impedance to the primary can also be used to determine the phase reference.

In an embodiment the switching means is operated using phase angle control wherein the phase angle of the switching is adjusted in response to the switching characteristic. Phase angle control may be more useful when operating low frequency/high power applications because continuous power transfer is allowed and a seamless or substantially ripple free power transfer may occur. This may also make the regulation of the power flow more efficient because there is less ripple present.

In an embodiment the switching means is turned on/off to adjust the power transfer of the converter. On/off control may be more useful in high frequency low power applications because it allows for on/off frequency to be significantly higher which results in requiring smaller smoothing capacitors. In addition, on/off control offers significant improvements in efficiency at high frequency operation because less switching is required (as no switching needs occur when the switches are in the off state). The operation at high frequency allowed by on/off control allows the use of smaller components (such as capacitors) making the system more compact and a reduction in the circulating energy losses in the resonant tank.

In an embodiment the switching means operates using both phase angle control and on/off control.

In an embodiment the switching means remains off for more than one resonant period in order to control the power transferred between the converters.

In an embodiment the switching means operates at a substantially fixed switching frequency.

Operation at a fixed frequency allows the converter to operate at, or substantially at regulation limited frequencies or bands. Fixed frequency operation also avoids the requirement to adjust the frequency so as to switch at substantially zero voltage, allowing for less complex and cheaper implementation.

In an embodiment the switching means is operated with substantially zero voltage switching. Switching at zero voltage improves the performance and efficiency of the switch and allows faster switching because of reduced time taken to switch and reduction of switching losses due to the low power situation.

In an embodiment the switching means is synchronised with the zero voltage switching of the second converter.

In an embodiment the IPT converter is a primary.

In an embodiment the IPT converter is a pick-up.

In an embodiment the switching means may be operated so as to smooth or regulate the input and/or output voltage.

In one example the converter may then act as a pre- or post-regulator. A converter acting as a pre-regulator reduces the component count of the circuit and allows the size of the converter to be reduced. The losses associated with the removed components are reduced and fewer components may make the circuit more reliable. Traditionally, a pre or/and post regulator(s) is employed to control the input voltage and regulate power flow, incurring additional losses and costs.

In an embodiment the switching means operate at a high frequency.

In an embodiment the switching frequency is above 1 MHz.

In an embodiment the switching frequency is above 6 MHz.

In an embodiment the converter relies on the parasitic reactances of circuit components in the converter. The use of parasitic components may reduce the number of components providing more reliable operation and reduced converter size.

In an embodiment the converter relies on parasitic components for switch capacitances.

In an embodiment the push-pull resonant converter has two or more inductive elements which split current from the power source.

In an embodiment the inductive elements form part of the resonant circuit.

In an embodiment the inductive elements are formed by the coupling elements of the converter.

According to a second aspect, there is provided an inductive power transfer (IPT) system primary converter, the supply comprising:
  a push-pull resonant converter having a resonant frequency;
  the converter having switching means operated at a switching frequency below the resonant frequency.

This IPT primary converter enables a loosely coupled wireless transfer link to an IPT secondary or pick-up, for example in applications such as charging electric vehicles or electronics devices such as smartphones without cables. In other words there is typically an air gap between primary and secondary coils and without an iron core helping to couple their magnetic fields as in a transformer for example. In such applications the inductive or magnetic coupling is not constant but may vary dynamically for example due to changing distance between the primary and secondary, as well as changing loading on the secondary.

Operating the primary at a switching frequency below the resonant frequency allows for reduced complexity and cost and increased efficiency as noted above. Whilst this may mean that the resonant current is no longer sinusoidal the switching losses are reduced because the switches turn-on and turn-off only at near zero voltage providing the above noted advantages.

In an embodiment the primary converter has communication, either dedicated or through changing or measuring the circuit characteristics for transmitting a switching characteristic to one or more pick-up converters.

In an embodiment the switching frequency is substantially constant.

In an embodiment the switching characteristic is a phase reference.

In an embodiment the converter further comprises a control means for determining a switching characteristic corresponding to the switching of a pick-up converter coupled to said IPT converter.

According to a third aspect, there is provided an inductive power transfer (IPT) system pick up, the pick-up comprising:
  a push-pull resonant converter having a resonant frequency;
  the converter having switching means operated at a switching frequency below the resonant frequency.

Operating the pick-up at a switching frequency below the resonant frequency allows for reduced complexity and cost and increased efficiency as noted above. Whilst this may mean that a pure sinusoidal resonant current is not received switching losses are still reduced because the turn-on and turn-off occurs only at near zero voltage providing the above noted advantages.

In an embodiment the switching frequency is substantially constant.

In an embodiment the switching means operates zero voltage switching for a variety of loads.

In an embodiment the pick-up has means for receiving a switching characteristic from a primary.

In an embodiment the pick-up may obtain the switching characteristics of the primary by monitoring the magnetic field produced by the primary or by monitoring the characteristics of the pickup converter such as real and reactive power transferred to the output.

In an embodiment the pick-up may act as a primary converter to a further pick-up converter.

In an embodiment the switching characteristic is a phase reference.

In an embodiment the converter further comprises a control means for determining a switching characteristic corresponding to the switching of a primary converter coupled to said IPT converter.

In an embodiment the pick-up converter may also act as a primary converter. In this case the pick-up is able to connect to further pick-up converters so as to transfer power or charge without the use of a charging station.

In an embodiment the pick-up may be connected to a charge storage device or battery.

According to a fourth aspect, there is provided an inductive power transfer (IPT) system, the system comprising:
 a primary converter comprising a first push-pull resonant converter and first switching means, and
 a pick-up comprising a second push-pull resonant converter and second switching means.

A system having push-pull converters with switching means on both the primary converter and pick-up allows the system to react to changes by or to one or both of the converters. For instance the secondary switching means may operate to regulate the power transferred from the primary. Alternatively any variation in the power transferred from the primary may be compensated for by the switching means of the secondary. This allows the efficiency of the system to remain high when the resonant current is non-sinusoidal.

In an embodiment the pick-up has means for determining a switching characteristic corresponding to the switching of the primary converter.

In an embodiment at least one or both of the switching means are operated at a switching frequency below the resonant frequency.

In an embodiment the first and second switching means are operated in a particular manner in relation to the switching dependent on the switching characteristic including if synchronised or offset.

According to a fifth aspect, there is provided a method of operating an inductive power transfer (IPT) system comprising a first push-pull converter and a second push-pull converter the method comprising the steps of:
 operating a switching means of the first converter at a switching frequency below the resonant frequency of the first converter,
 determining a signal corresponding to a switching characteristic of the first converter at the second converter, and
 operating a switching means of the second converter dependent on the switching characteristic.

The transfer of a switching characteristic from the first to the second converter allows the second converter to adjust aits switching means so as to operate in appropriate relation with the first converter. This allows variation in the power transfer characteristic, such as a non-sinusoidal waveform to be efficiently transmitted because the secondary does not assume that ideal, or near ideal power transfer from the primary.

In an embodiment the first converter is a primary converter and the second converter is a pick-up.

In an embodiment the first converter is a pickup and the second converter is a primary converter.

In an embodiment the method comprises the step of operating the switching means (3) of the primary converter at a substantially constant frequency.

In an embodiment the method comprises the step of adjusting the relative phase angle between the primary converter and pick up switching means to control the power transfer.

In an embodiment the method comprises the step of turning one or both of the switching means off temporarily to control the power transfer.

In an embodiment the method includes the step of the signal characteristic being transmitted by communications signal from the first converter.

In an embodiment the method includes the step of the signal characteristic being received by the second converter sensing a circuit characteristic.

In an embodiment the method comprises the step of operating the switching means using zero voltage switching.

In an embodiment the method comprises the step of regulating the power transfer using the switching means of the first converter.

In an embodiment the method comprises the step of regulating the power transfer using the switching means of the second converter.

According to a sixth aspect, there is provided an inductive power transfer (IPT) converter, the supply comprising:
 a push-pull resonant converter having a resonant frequency;
 the converter having switching means operated so as to regulate the input or output voltage of the converter.

Means to regulate the input voltage using the converter switching means removes or reduces the need for pre-regulation of the input voltage prior to the converter. Similarly regulation of the output voltage by the switching means of the converter may remove the requirement for a post regulator to provide a substantially constant output voltage. Removing a pre or post-regulator reduces the number of, and losses due to, components and therefore can reduce the size of the converter.

In an embodiment the switching means also controls the power flow through the converter. For example the switching means may monitor the power flow and regulate the input or output power.

The embodiments described above may apply to any one or more of the described aspects where appropriate.

The disclosed subject matter also provides connector apparatus or connection of methods which may broadly be said to consist in the parts, elements and features referred to or indicated in this specification, individually or collectively, in any or all combinations of two or more of those parts, elements or features. Where specific integers are mentioned in this specification which have known equivalents in the art to which the invention relates, such known equivalents are deemed to be incorporated in the specification.

Further aspects of the invention, which should be considered in all its novel aspects, will become apparent from the following description.

DRAWING DESCRIPTION

A number of embodiments will now be described by way of example with reference to the drawings in which:

FIG. 2a-c is an embodiment of the primary converter waveforms in an embodiment of a resonant converter.

FIG. 3a-c is an embodiment of the on-off control waveforms in an embodiment of a resonant converter.

DETAILED DESCRIPTION OF THE DRAWINGS

Throughout the description like reference numerals will be used to refer to like features in different embodiments.

Figure 1:
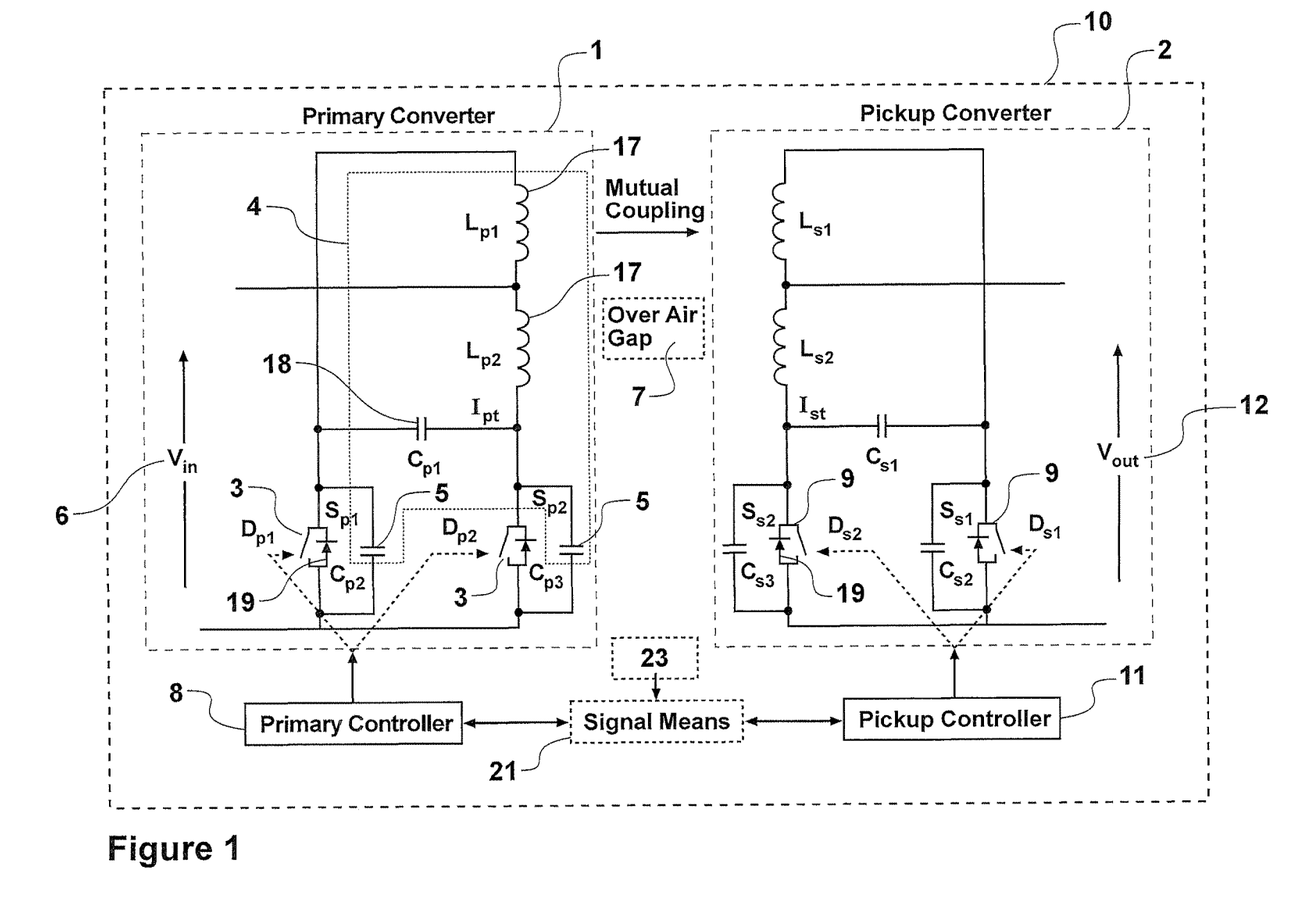
FIG. 1 is an embodiment of a push-pull parallel resonant converter.

Referring first to FIG. 1 an embodiment is shown having a primary, power supply or track converter 1 and a secondary or pick-up converter 2 forming an IPT system 10. The converters are loosely coupled across a gap, in one embodiment an air gap 7. Such an arrangement may be applied in inductive power transfers applications for example. In an embodiment the converters operate at high frequencies, above 1 MHz and preferably above 6 Mhz, although not limited to these frequencies. The most effective frequency to use may also be dependent on the load and resonant circuit. This can allow the use of parasitic circuit inductances or capacitances instead of employing separate inductors or capacitors. In an embodiment the high frequency operation and low component count allow the converters to be compact and efficient.

The primary converter 1 comprises a resonant circuit 4, switching means 3 and an input voltage or power 6. The resonant circuit 4 is shown as comprising two inductive elements 17 and a capacitive element 18 and the switching capacitors 5. It would be understood by one skilled in the art that the resonant circuit of a push-pull inverter is not limited to this arrangement. For example alternative arrangements have a separate inductor in series with the input power source or have separate tank circuits. In the example shown the inductive components 17 also form the track circuit or are elements (power transmitter or receiver coils) used to wirelessly transfer power. The switching means 3 is shown as comprising two switches. The switches may be, but are not limited to MOSFETs, GaNFETs or similar devices. The switches are shown as including a body diode 19 and parasitic capacitance 5. In an embodiment the diode 19 and/or capacitance 5 may be replaced by separate components, this may provide improved component values or operation.

The embodiment of the secondary converter 2 shown in FIG. 1 is similar to the primary converter 1 comprising a resonant circuit, switching means 9 and an output voltage or power 12. In embodiments not shown the secondary may be a passive converter such as a diode rectifier or an alternative IPT converter including a push-pull converter. The secondary converter 2 is loosely coupled to a primary converter 1 and is adapted to receive power transferred wirelessly with the switching means 9 being used to process and convert the received power into the output power or voltage 12.

In an embodiment parasitic components may be used instead of circuit components, including in place of capacitances 5 and inductances 17. For instance the switching capacitances Cp1 and Cp2 could be the parasitic capacitances of the switches. Similarly the inductances Lp1 and Lp2 could be provided by the parasitic inductance of the track or coupling means. The use of parasitic elements may reduce the component count, or size of any additional components and improve reliability. The use, or ability to use, any parasitic elements may be determined by the switching frequency of the circuit.

In an embodiment a first converter, being primary 1 and/or secondary 2 converters, may have a control means 8, 11 for determining a switching characteristic corresponding to the switching of a second converter. These controllers could be any suitable electronic or digital processing equipment which is configured to operate the switches in the manner herein described. The switching characteristic 23 may be a phase reference value or relative phase reference, a timing of the switching of the second converter, a switching pattern or an indication of the current switch positions of the second converter. For example the second converter may send a wireless signal, such as a radio frequency (RF), magnetic or optical signal or a digital phase lock loop (PLL), indicating the rising and falling edges of control waveform for the switches ($D_{p1}$) which can be detected to derive a phase reference. However other switching characteristics 23 may alternatively or additional be used. In an embodiment the signal characteristics 23 may be detected by a sense winding, for example by monitoring of the magnetic field produced by the primary or secondary windings.

A phase reference can be derived by monitoring the circuit characteristics such as the voltage across the resonant circuit or the real and reactive power transferred to the output. The second converter 2, 1 may be switched with respect to a first converter side 1, 2 phasor, such as the voltage or current. The phasor may be used to derive a relative phase angle or phase of the first converter. The switching of the second converter 2, 1 can then be related to the first converter 1, 2, for instance by being driven with respect to the reference phasor, so as to improve the co-ordination between them.

The control means 8, 11 may include at least one of logic, circuitry or computational means or other technique. For example the control means may have as an input the switching characteristic and may provide as an output the appropriate signals (i.e. Dp1, Dp2) to the switches (Sp1, Sp2). In an embodiment the control means 8, 11 may use the switching characteristic to change, amend, stop or delay the operation of the switching means 3, 9. The control means 8, 11 may be solely dependent on the switching characteristic 23 or could also take a range of inputs internal or external to the converter, for instance the required power level.

Figure 2:
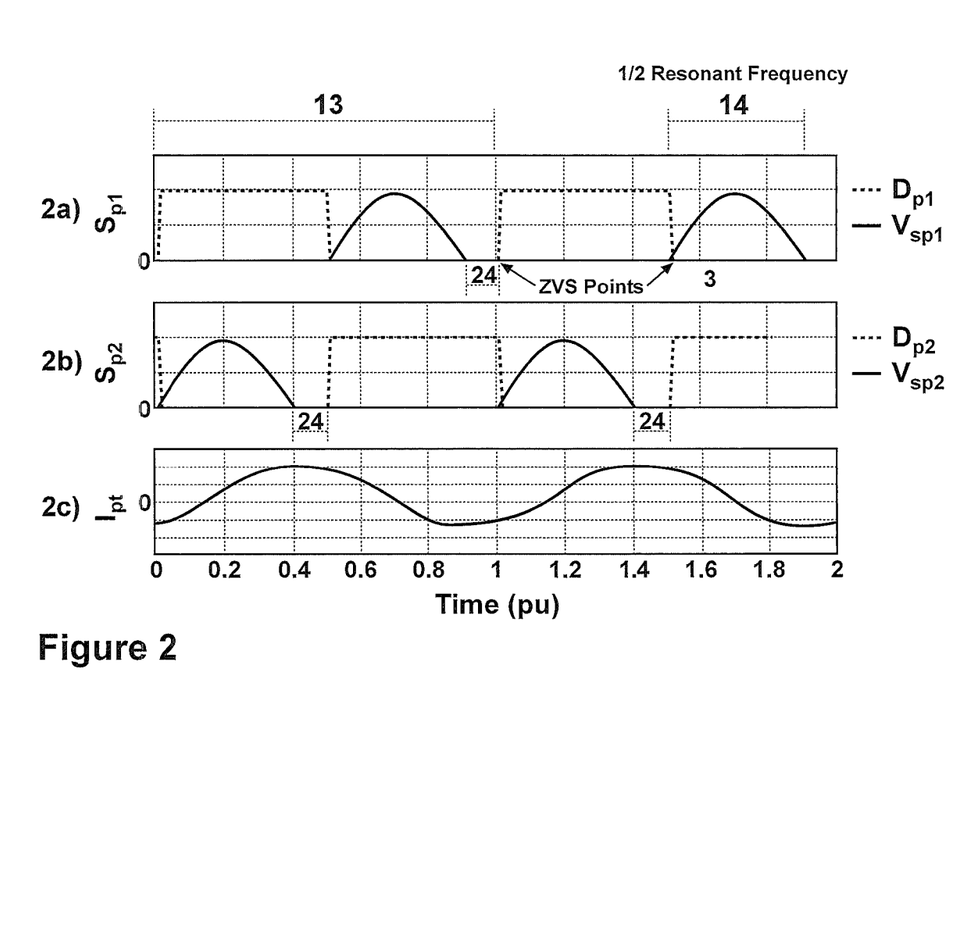

Referring now to FIG. 2 an embodiment is shown where the switching means 3 of a primary converter 1 is operated at a switching frequency 13 below the resonant frequency 14 of the resonant circuit. In an embodiment the switching frequency may be as close as possible to the resonant frequency to account for an expected load variation. The resonant frequency 14 is substantially the frequency at which the resonant circuit would resonate or be resonant when not driven by a switching means, based on the inductance, capacitance and loading of the resonant circuit or system. In the embodiment shown in FIG. 1 the resonant frequency will be substantially based on the capacitance 18 and inductance 17, modified by the switching capacitances Cp2 and Cp3 and with further modification depending on the impedance reflected on to the primary be the pickup.

Where a switching frequency 13 is chosen which is below the resonant frequency 14 the wave-forms of FIGS. 2a and 2b demonstrate that voltage across the open switch (for example Sp2) follows the resonant frequency 13. When the voltage drops to zero the body diode 19 of the open switch is forwardly biased and the resonant circuit is shorted. This creates a zero voltage situation across the switches Sp2 and Sp1 allowing for more efficient switching. In an embodiment where the switches are then toggled the resonant voltage will appear over the second switch, Sp1 and again will return to zero following half a resonant period. In this embodiment the operation of the switching means creates a zero voltage period 24 in which the resonant circuit is short circuited. The switching frequency 13 should be selected so that this period is relatively short in comparison to the switching frequency, but is long enough to maintain a zero voltage period 24 for an expected range of load (and hence resonant frequency) fluctuation. FIG. 2c shows the current waveform for the embodiment of FIG. 2. The current waveform may become non-sinusoidal, with the zero voltage period 24 creating a high current period and stretching the waveform. In an embodiment the effect of the non-sinusoidal waveform regarding power transfer may be handled by the connected converter having switching means operated in a complementary manner.

In an embodiment the converter 1, 2 may be operated at a substantially fixed switching frequency 13, thereby avoiding undesirable variable switching frequency operation employed in prior art. This fixed switching frequency may be pre-determined prior to operation of the converter. In some embodiments the fixed frequency may be chosen dependent on a coupled converter. At high frequencies it is difficult to measure the zero voltage points accurately and change the frequency of operation within the limited time frame. Operating at a fixed frequency may improve adherence to regulatory limits (such as EMI) and may allow a narrower bandwidth of frequency at high frequencies. For instance a standard operating frequency may be 6.78 MHz, embodiments described could operate at this fixed frequency while switching at zero voltage. This includes embodiments where the load is changing, or known to change between some limits. The performance and efficiency may vary with the changing load, however in embodiments with active primary and secondary converters some compensation may be available using control or switching techniques. In an embodiment the converter 1, 2 may be designed to handle a range of load levels while using ZVS. In particular these load levels may include the entire range of expected loads. An embodiment which operates a converter at a fixed frequency may simplify the system design, reduce component count, eliminate issues with bifurcation (for example, having multiple possible frequencies of operation) and improve performance.

The control of the power flow of an IPT system 10 may be controlled by regulating the relative phase difference or angle between the primary 1 and secondary 2 converters. The power transferred to the load, and therefore the load voltage, is regulated by controlling the relative phase angle of the drive signals applied to the pickup converter with respect to the primary drive signals. In this embodiment each converter 1, 2 may have an active switching means and a switching characteristic 23 may be shared between them so as they can determine the operation of the respective converters. By varying the phase angle between the primary 1 and pick up 2 the power flow can be varied in a bidirectional manner where the primary becomes the pick-up and vice versa. Phase angle control may be most useful in a system operating at lower frequencies and higher powers as the power is transferred more consistently but the timing between switches may be more complex or time sensitive. The more consistent power transfer results in a seamless or ripple free or reduced power transfer which may reduce any pre or post-regulation required which is advantageous for high power operation.

Figure 3:
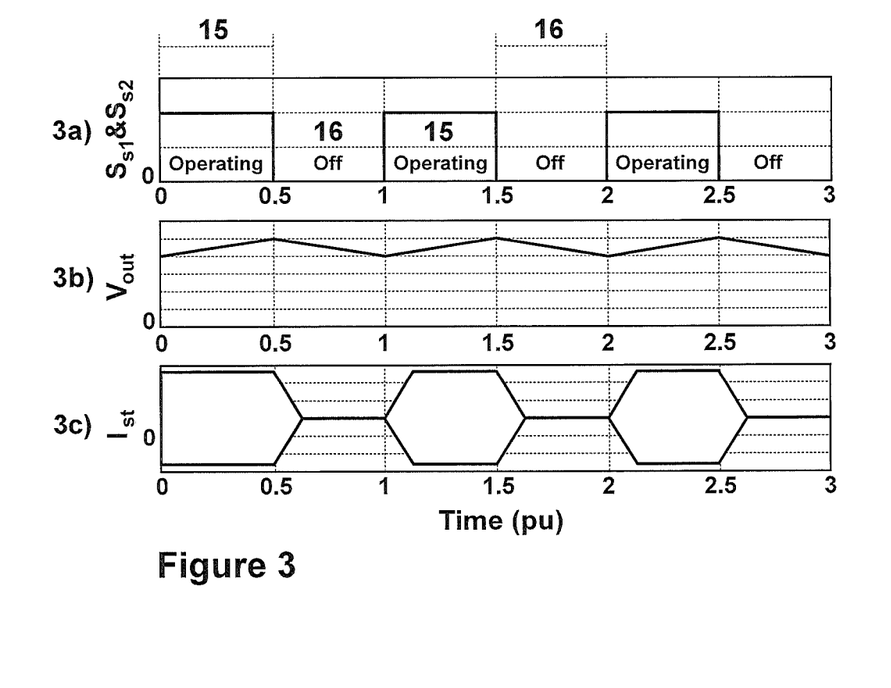

Referring now to FIG. 3 an embodiment of a control system for the converter 1, 2 is shown in to which on/off control is used. In the embodiment shown on/off control is demonstrated on the pick-up converter. The output voltage is shown in FIG. 3b. Initially the switching means 9 is operating and the output voltage 12 is increasing. When a voltage threshold is reached (at time=0.5), or a signal is received, the switches Ss1 and Ss2 stop operating and may remain in an off position. This causes the power flow to the output to stop, therefore causing the output voltage to decrease. When the output voltage 12 reaches a low threshold the switching means 9 begins operating again and the output voltage increases, beginning the cycle again. In the manner described the output power flow, or voltage 12 can be controlled, with the thresholds being set to maintain the desired level of ripple or variation. The operation at high frequency allowed by on/off control allows the use of smaller components (such as capacitors) making the system more compact and a reduction in the circulating energy losses in the resonant tank.

In an embodiment the on/off control strategy is used for lower power, high frequency systems. This may be because the timing involved in the system is relatively straightforward in terms of synchronising the primary and secondary converters and therefore can operate at high frequency. The on/off control also has periods, including of more than one resonant cycle or period, in which no switching is taking place—removing losses incurred by that switching. The switching between operating or on and off control periods will typically occur at a ZVS point to avoid increased switching losses. In an embodiment the on/off switching will be at a sub-harmonic of the fundamental switching frequency 13 of the converter. As shown in FIG. 3c the frequency may be far below the switching frequency 16. In embodiments where a first converter 1, 2 is using on/off control a second converter loosely coupled to it may continue normal switching. Alternatively the second converter may follow (including some delay or other change) the on/off control strategy of the first converter or may operate on/off control independently based on a second input or output signal. In an embodiment a converter 1, 2 may combine the use of phase reference and on/off control as described. For example a converter could use the relative phase angle between the primary and secondary to control the power level and on/off control to regulate the power level.

In an embodiment a post-regulator may be present to reduce ripple further, although the system is capable of operation without this. In an embodiments the on/off control strategy may be applied to a primary converter 1. This may control the output voltage or may be used as a pre-regulator as described in more detail below. In an embodiment the primary 1 and secondary 2 converters may both use on/off control, working in conjunction they may regulate at least one or both of the input and output voltages. In an embodiment a primary converter using on/off control may be connected to a passive pick-up. The primary converter could then regulate the output power, although the operation may not be as efficient as when a pickup 2 with switching means 9 is used.

In an alternative explanation of the on/off control strategy described previously the load voltage and power can be regulated through a novel on-off control of pick-up of the push-pull converter as shown in FIG. 3. As evident from FIG. 3 when the output voltage 12 falls below a lower limit/signal/threshold, the pickup 2 switches operated to transfer power to the load. When the output voltage 12 exceeds an upper limit/threshold the pickup switches are turned off to decouple the load from the primary side. The control strategies described may apply to operation at variable frequency. However as described above this would require additional components to measure and adjust the switching frequency and may lead to efficiency losses.

Two control strategies are also proposed to regulate the output power and voltage 12 without an extra conversion stage. An embodiment may eliminate the need for a pre-regulator stage, which is typically essential for conventional push-pull based IPT systems. In an embodiment the post-regulation may also or alternatively be performed, at least in part, by the converter. Including a pre-regulator to remove or reduce ripple in the input voltage 6 requires additional componentry and is necessary for typical converters in order to operate efficiently. By monitoring a circuit characteristic, such as voltage or power level the switching means 3, 9 which is likely already in an embodiment is also able to perform the regulation action, providing efficiency, cost and size savings. The power transfer capability is related to current $I_{pt}$. The pre-regulator and/or on/off control could be used to monitor and regulate current $I_{pt}$ to suit load conditions while maximizing power transfer efficiency. In an embodiment of the invention a primary converter 1 may act as a pre-regulator for a passive secondary to reduce component count. However it is likely that efficiency would be improved if an active secondary converter 2 is used.

Figure 4:
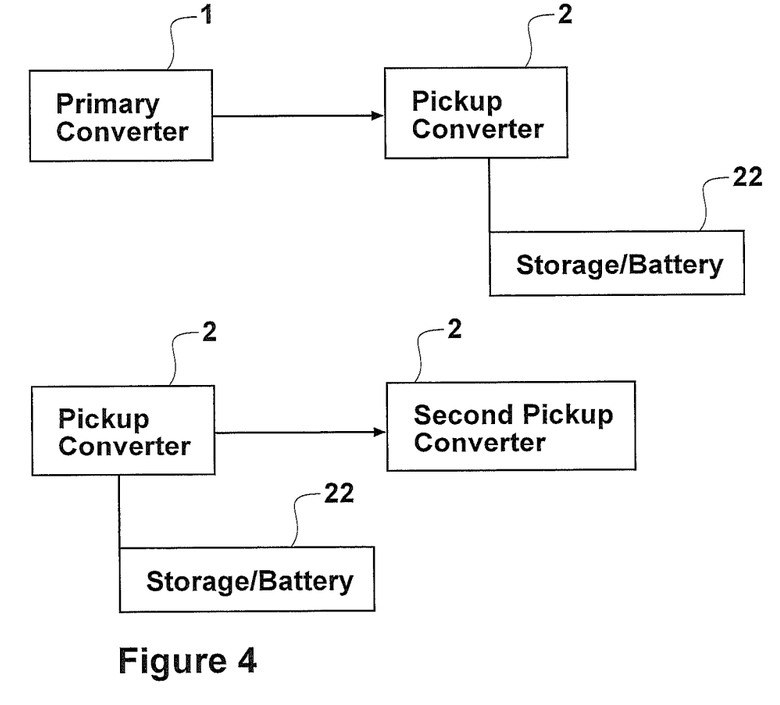
FIG. 4 is block diagram showing an embodiment of the converter adapted to act as either a primary or pick-up converter.

Referring now to FIG. 4 in an embodiment a converter may be adapted to operate as either a primary 1 or a pick-up converter 2. This may allow, for example, a pick-up converter 2 to be connected to a battery 22 or charge storage medium 22. The pick-up may then be charged from a coupled primary converter 1. After being partially or completely charged the pick-up 2 may then be coupled to a second pick-up converter 2, becoming the primary converter 1 and transferring the stored power to the second pick-up converter 2. In this way an embodiment may act as charge storage device having a wireless charging means, or allow power to be transferred between devices when required. For instance if a phone battery was almost depleted it could be wirelessly recharged form the pick-up controller of a laptop or tablet where no primary controller was present. In an embodiment an efficient means of exchanging power between electronic devices in addition to charging and powering them is provided. In an embodiment the primary and pick-up converters may be interchangeable.

In an embodiment a converter 1, 2 arrangement enables bi-directional and wireless power transfer at very high frequencies, which could be in MHz, and may be particularly attractive for low to medium power applications. For example, embodiments may provide an efficient means of supplying wireless power to consumer devices such as mobile phones, laptops, TVs, etc, from a charging pad. In an embodiment the converter 1,2 may be relatively simple, cost effective, compact and expected to facilitate wireless power transfer at an improved efficiency and high frequency. The converter 1, 2 or system 10 may also allow an exchange power between electrical devices without requiring an additional medium such as a charging pad. In an embodiment, as shown in FIG. 1 a push-pull parallel resonant system 10 with only two switches on the primary (supply) 1 and the secondary (load) 2 side of the system 10 may enable bi-directional power flow efficiently over an air gap but with minimum additional passive (such as capacitors) components. In an embodiment the converters are operated at a fixed frequency at zero voltage switching (thereby reducing switching losses incurred at high frequencies) over the entire load profile but without any zero voltage switching detection scheme, essential for all conventional systems. In an embodiment the system 10 can be operated efficiently at high frequencies in the range of MHz and may utilize parasitic elements of the systems.

From the foregoing it will be seen that a converter and a method for operating a converter is provided which is adapted to operates at high frequency.

Unless the context clearly requires otherwise, throughout the description, the words "comprise", "comprising", and the like, are to be construed in an inclusive sense as opposed to an exclusive or exhaustive sense, that is to say, in the sense of "including, but not limited to".

Although this disclosure has been described by way of example and with reference to possible embodiments thereof, it is to be understood that modifications or improvements may be made thereto without departing from the scope of the invention. The scope of protection may also be said broadly to consist in the parts, elements and features referred to or indicated in the specification of the application, individually or collectively, in any or all combinations of two or more of said parts, elements or features. Furthermore, where reference has been made to specific components or integers of the invention having known equivalents, then such equivalents are herein incorporated as if individually set forth.

Any discussion of the prior art throughout the specification should in no way be considered as an admission that such prior art is widely known or forms part of common general knowledge in the field.

The invention claimed is:

1. An inductive power transfer (IPT) transmitter comprising:
   a push-pull resonant first converter having a resonant frequency, and configured to operate at a switching frequency below the resonant frequency and dependent on a switching characteristic of a second converter configured to inductively couple to said transmitter,
   wherein a switching of the first and second converter is arranged to operate using phase angle control whereby a phase angle of the switching is adjusted in response to the switching characteristic.

2. The transmitter according to claim 1, wherein the switching characteristic comprises one or more of the following: relative phase difference between switching signals of the first and second converters; a switching signal of the second converter; an indication of switch positions of the second converter.

3. The transmitter according to claim 1, wherein the switching of the first converter is arranged to operate in synchronism with the switching of the secondary converter, or at an offset to said switching.

4. The transmitter according to claim 1, wherein the switching frequency is set at a frequency sufficiently below the resonant frequency corresponding to a predetermined range of second converter loading and coupling between the first and second converters.

5. The transmitter according to claim 1, further comprising:
   means for determining a switching characteristic corresponding to the switching of the second converter when inductively coupled to the transmitter; and
   a switch controlled in order to switch the first converter at the switching frequency.

6. The transmitter according to claim 5, wherein the means for determining a switching characteristic comprises one or more of the following: a sense winding to measure magnetic fields produced by the first or second converter; communication means for receiving a signal from the second converter which is indicative of the switching characteristic.

7. The transmitter according to claim 1, wherein the switching of the first and second converter is arranged to turn on/off in order to regulate power transfer of the first converter.

8. The transmitter according to claim 1, having primary tracks or inductive power transmitter coils which operate as inductors for the push-pull resonant converter.

9. The transmitter according to claim 1, and arranged to operate at a switching frequency above 1 MHz.

10. An inductive power transfer (IPT) system comprising an inductive power transfer IPT transmitter according to claim 1, and a second converter inductively coupled to said transmitter.

11. The system according to claim 10, wherein the second converter comprises a push-pull resonant converter in which a switching is arranged to switch in a manner corresponding to a switching of the inductive power transfer converter.

12. The system according to claim 11, wherein the switching of the second converter is arranged to operate at a switching frequency below a resonant frequency of the second converter.

13. The transmitter according to claim 1, further comprising switching means operated so as to regulate an input or output voltage of the resonant converter.

14. A method of operating an inductive power transfer (IPT) system comprising a first push-pull resonant converter having a resonant frequency, the method comprising:
determining a switching characteristic of a second converter which is inductively coupled to the first converter;
switching the first converter at a switching frequency below the resonant frequency of the first converter and dependent on the switching characteristic; and
switching the first and second converter using phase angle control whereby a phase angle of the switching is adjusted in response to the switching characteristic.

15. An inductive power transfer (IPT) system pick up to receive electrical power from a first converter, the inductive power transfer (IPT) system pick up comprising:
a push-pull resonant converter having a resonant frequency;
the push-pull resonant converter having switching means operated at a switching frequency below the resonant frequency,
wherein a switching of the first converter and the inductive power transfer (IPT) system pick up is arranged to operate using phase angle control whereby a phase angle of the switching is adjusted in response to a switching characteristic of the inductive power transfer (IPT) system pick up.

16. An inductive power transfer (IPT) system comprising a primary converter inductively coupled to an inductive power transfer (IPT) system pick-up according to claim 15.

17. The system according to claim 16, wherein the switching frequency of the primary converter and inductive power transfer (IPT) system pick-up are substantially equal.

18. The system according to claim 15, wherein the primary converter further comprises means for determining a switching characteristic of the inductive power transfer (IPT) system pick-up and wherein the switching frequency is arranged to be further dependent on said switching characteristic.

19. The transmitter according to claim 13, wherein the switching means is configured to be turned on/off in order to regulate.

\* \* \* \* \*